US012679657B2

(12) United States Patent
Lyons et al.

(10) Patent No.: US 12,679,657 B2
(45) Date of Patent: Jul. 14, 2026

(54) BULK DISPENSER ACTUATION DETECTION

(71) Applicant: Retail Space Solutions LLC, Milwaukee, WI (US)

(72) Inventors: Christopher Lyons, Western Springs, IL (US); Craig Pavlich, Glen Ellyn, IL (US)

(73) Assignee: Retail Space Solutions LLC, Milwaukee, WI (US)

( * ) Notice: Subject to any disclaimer, the term of this patent is extended or adjusted under 35 U.S.C. 154(b) by 351 days.

(21) Appl. No.: 18/521,538

(22) Filed: Nov. 28, 2023

(65) Prior Publication Data

US 2024/0092583 A1    Mar. 21, 2024

Related U.S. Application Data

(63) Continuation of application No. PCT/US2022/031306, filed on May 27, 2022.

(Continued)

(51) Int. Cl.
*A47F 1/02* (2006.01)
*A47F 1/035* (2006.01)
(Continued)

(52) U.S. Cl.
CPC ............ *B65G 11/206* (2013.01); *A47F 1/035* (2013.01); *G07F 9/00* (2013.01); *G07F 13/04* (2013.01); *B65G 2201/047* (2013.01)

(58) Field of Classification Search
USPC ................................................. 700/231–244
See application file for complete search history.

(56) References Cited

U.S. PATENT DOCUMENTS

| 4,903,866 A | 2/1990 | Loew |
| 5,437,393 A | 8/1995 | Blicher et al. |

(Continued)

FOREIGN PATENT DOCUMENTS

| CA | 3048200 A1 | * 12/2019 | ............. G07F 11/44 |
| EP | 1121293 B1 | 12/2004 | |
| WO | 2004007345 A1 | 1/2004 | |

OTHER PUBLICATIONS

International Search Report for International Application No. PCT/US2022/031306, mailed Sep. 6, 2022.

(Continued)

*Primary Examiner* — Jonathan L Sample
(74) *Attorney, Agent, or Firm* — Andrus Intellectual Property Law, LLP

(57) ABSTRACT

A gravity-feed dispenser is connected to a hopper configured to hold a bulk material for dispense. The gravity-feed dispenser includes a spout and a valve separating the hopper from the spout. An actuator assembly is connected to the valve and includes a detectable element. The actuator assembly is operable to move the valve between open and closed conditions to selectively permit bulk material to pass from the hopper out of the spout. A fixture is configured to engage and support the gravity feed dispenser. A sensor is connected to the fixture and is positioned relative to the actuator assembly. The sensor operates to detect the detectable element of the actuator assembly and produce a signal indicative of the open condition or the closed condition.

20 Claims, 6 Drawing Sheets

Related U.S. Application Data

(60) Provisional application No. 63/195,988, filed on Jun. 2, 2021, provisional application No. 63/194,576, filed on May 28, 2021.

(51) Int. Cl.

| | |
|---|---|
| *B65G 11/20* | (2006.01) |
| *G07F 9/00* | (2006.01) |
| *G07F 13/04* | (2006.01) |

(56) References Cited

U.S. PATENT DOCUMENTS

| | | | |
|---|---|---|---|
| 6,182,864 B1 | 2/2001 | Elmore | |
| 6,241,123 B1 * | 6/2001 | Elmore | A47F 1/035 |
| | | | 222/542 |
| 9,611,108 B1 * | 4/2017 | Johnson | B65G 65/32 |
| 10,450,152 B2 | 10/2019 | Brundick et al. | |
| 2005/0269366 A1 | 12/2005 | Brundick et al. | |
| 2006/0113324 A1 * | 6/2006 | Rudesill | A47F 1/035 |
| | | | 222/132 |

| | | | |
|---|---|---|---|
| 2007/0131762 A1 * | 6/2007 | Dumont | G07F 13/065 |
| | | | 235/381 |
| 2012/0199244 A1 * | 8/2012 | James | G07F 17/0092 |
| | | | 141/331 |
| 2016/0015219 A1 | 1/2016 | Rosalia et al. | |
| 2016/0128906 A1 * | 5/2016 | Baarman | A61J 7/04 |
| | | | 221/13 |
| 2017/0150698 A1 * | 6/2017 | Zaidi | A01K 5/0225 |
| 2018/0218562 A1 * | 8/2018 | Conway | A47F 1/035 |
| 2019/0092617 A1 | 3/2019 | Brundick et al. | |
| 2020/0090114 A1 * | 3/2020 | Conway | G01G 19/4144 |
| 2020/0189836 A1 * | 6/2020 | Sunesson | A47F 1/08 |
| 2020/0405075 A1 * | 12/2020 | Mackay | A47F 10/02 |
| 2021/0127630 A1 * | 5/2021 | Zimmerman | G08C 17/00 |

OTHER PUBLICATIONS

Purcell's SmartBins Add-on System, https://www.youtube.com/watch?v=DI-tE25oOyY, Accessed Jul. 4, 2023.

International Search Report and Written Opinion for International Application No. PCT/US2022/031308, mailed Sep. 6, 2022.

\* cited by examiner

BULK DISPENSER ACTUATION DETECTION

CROSS-REFERENCE TO RELATED APPLICATIONS

This application is a continuation of International Patent Application No. PCT/US2022/031306, filed May 22, 2022, which claims priority of U.S. Provisional Patent Application No. 63/194,576, filed on May 28, 2021, and U.S. Provisional Patent Application No. 63/195,988, filed on Jun. 2, 2021, the contents of which are incorporated by reference herein in their entirety.

BACKGROUND

The present disclosure relates to the field of bulk dispensing bins, particularly those for use by consumers at point-of-sale installations. More specifically, the present disclosure relates to features detect dispense actuations and leverage detected dispenses for bulk dispensing feedback and operational control.

Bulk dispensers, and more particularly gravity-feed bulk dispensers are known and used in commercial settings for self-service portioning of bulk materials, for example foods. Traditionally, gravity feed bins for dispensing bulk materials are used to dispense a wide variety of materials having a range of sizes and aggregate make-ups as diverse as hardware components (e.g. nuts and bolts) or food (e.g. nuts, cereals, grains, pastas, coffee (beans or ground), dried soup mix, candies, spices). Generally, the bins include an enclosure having an inlet at an upper end through which the enclosure is filled, an outlet at a lower end for dispense of the material, and a flow control device located between the upper and lower openings for controlling the amount of materials being dispensed. In operation, as the material is being dispensed gravity pulls the remaining material in the enclosure towards the lower end to replace dispensed material. These types of bins generally include a downwardly curving inner wall that forms a chute to channel the dispensed materials in a receptacle adjacent the outlet.

Examples of known gravity feed bins are found in U.S. Pat. No. 4,903,866 entitled, "Gravity Dispensing Bin System"; U.S. Pat. No. 5,437,393, entitled, "Apparatus for Delivering Bulk Foods"; U.S. Pat. No. 6,182,864 entitled, "Bulk Food Dispensing Apparatus"; U.S. Pat. No. 6,241,123 entitled, "Bulk Food Dispensing Apparatus"; U.S. Pat. No. 10,450,152 entitled, "Expandable Gravity-Feed Bin"; and US Pat. App. Pub. No. 2019/0092617 entitled, "Expandable Gravity-Feed Bin." Each of these are incorporated by reference in their entireties.

BRIEF DISCLOSURE

The present disclosure relates to the field of bulk dispensing bins, particularly those for use by consumers at point-of-sale installations. More specifically, the present disclosure relates to features to limit direct contact between a user and the dispenser.

An example of a gravity-feed dispensing system includes a hopper configured to hold a bulk material for dispense. A gravity-feed dispenser is connected to the hopper. The gravity feed dispenser includes a spout and a valve separating the hopper from the spout. An actuator assembly is connected to the valve and is associated with a detectable element. The actuator assembly is operable to move the valve between open and closed conditions to selectively permit bulk material to pass from the hopper out of the spout. A fixture is configured to engage and support the gravity feed dispenser. A sensor is connected to the fixture and positioned relative to the actuator assembly. The sensor is operable to detect the detectable element of the actuator assembly and to produce a signal indicative of the open condition or the closed condition.

In examples of the gravity-feed dispensing system, the hopper is removably connected to the gravity-feed dispenser. The detectable element may be at least one of ferrous, conductive, or magnetic. The sensor may be an optical sensor and the detectable element is configured to reflect light emitted from the sensor. The sensor may be a radio frequency sensor and the detectable element is an RFID tag. The actuator assembly may include a pivotable spout extension or a handle.

In additional examples, the gravity-feed dispensing system includes a controller. The controller is configured to receive the signal from the sensor, to determine a dispense operation of the gravity feed dispenser from the signal, and to calculate an estimated dispense amount. A graphical display may be communicatively connected to the controller. The controller may be configured to operate the graphical display to present a visual indication of the estimated dispense amount. The controller may be configured to calculate an estimated dispense cost and to operate the graphical display to present a visual indication of the estimated dispense cost. The graphical display may be connected to the gravity-feed dispenser. The controller may be configured to provide an identification of the bulk material dispensed from the gravity-feed dispenser and the estimated dispense amount to a weighing and labeling system.

An example of a system for gravity-feed dispensing of bulk material includes a plurality of hoppers, each configured to hold a bulk material for dispense. A first gravity-feed dispenser includes a first hopper, a first spout, a first valve separating the first hopper from the first spout, and a first actuator assembly connected to the first valve, the first actuator assembly comprising a first detectable element and operable to move the first valve between open and closed conditions to selectively permit bulk material to pass from the first hopper out of the first spout. A second gravity-feed dispenser includes a second hopper, a second spout, a second valve separating the second hopper from the second spout, and a second actuator assembly connected to the second valve, the second actuator assembly comprising a second detectable element and operable to move the second valve between open and closed conditions to selectively permit bulk material to pass from the second hopper out of the second spout. A fixture is configured to engage and support the first gravity-feed dispenser and the second gravity-feed dispenser. A first sensor is connected to the fixture and positioned relative to the actuator assembly. The first sensor is operable to detect the first detectable element of the first actuator assembly and to produce a first signal indicative of the open condition or the closed condition of the first valve. A second sensor is connected to the fixture and positioned relative to the actuator assembly. The second sensor is operable to detect the second detectable element of the second actuator assembly and to produce a second signal indicative of the open condition or the closed condition of the second valve. A controller is communicatively connected to the first sensor and the second sensor. The controller is configured to receive the first signal and the second signal and configured to determine a dispense operation of the first gravity-feed dispenser or the second gravity-feed dispenser from the first signal and or the second signal.

Additional examples of the system for gravity-feed dispensing include a plurality of hoppers including the first and second hoppers and each are configured to be refilled and interchangeably connected to the first gravity-feed dispenser and the second gravity-feed dispenser. The fixture may include a shelf. The controller may be configured to calculate a first estimated dispense amount and a first estimated dispense cost of a first dispense operation of the first gravity feed dispenser. The controller may be configured to calculate a second estimated dispense amount and a second estimated dispense cost of a second dispense operation of the second gravity feed dispenser. A first graphical display may be communicatively connected to the controller. The controller may be configured to operate the graphical display to present a visual indication of at least one of the first estimated dispense amount and the first estimated dispense cost or the second estimated dispense amount and the second estimated dispense cost. The first graphical display may be physically associated to the first gravity-feed dispenser and configured to be operated by the controller to present a visual indication of the first estimated dispense amount and the first estimated dispense cost. A second graphical display may be physically associated to the second gravity-feed dispenser and configured to be operated by the controller to present a visual indication of the second estimated dispense amount and the second estimated dispense cost.

In still further examples of the gravity-feed dispensing system, a weighing and labeling station may be physically separated from the first gravity-feed dispense and the second gravity-feed dispenser. The weighing and labeling station may include a scale and a label printer. The label printer may be configured to print an identification label encoding weight information from the scale. The weighing and labeling station may be communicatively connected to the controller and configured to receive an identification of the first dispense operation and an identification of the second dispense operation. The weighing and labeling station may further include a graphical display configured to visually present an identification of the first dispense operation and an identification of the second dispense operation for selection by a user.

DETAILED DISCLOSURE

While gravity feed bins as those noted above provide an efficient and economical solution for bulk dispensing. Modern retailing seeks to gather data regarding product and installation use and to use that data to provide an improved customer experience. The addition of electronics to the existing solutions for bulk dispensing run contrary to the benefits identified above as electronics increase the dispenser cost while creating new challenges for power delivery, cleaning, and durability.

However, the inventors have developed new arrangements which can leverage the benefits of existing gravity feed bins while providing the data collection, customer interaction, and consumer experience in a modern retail setting.

Figure 1:
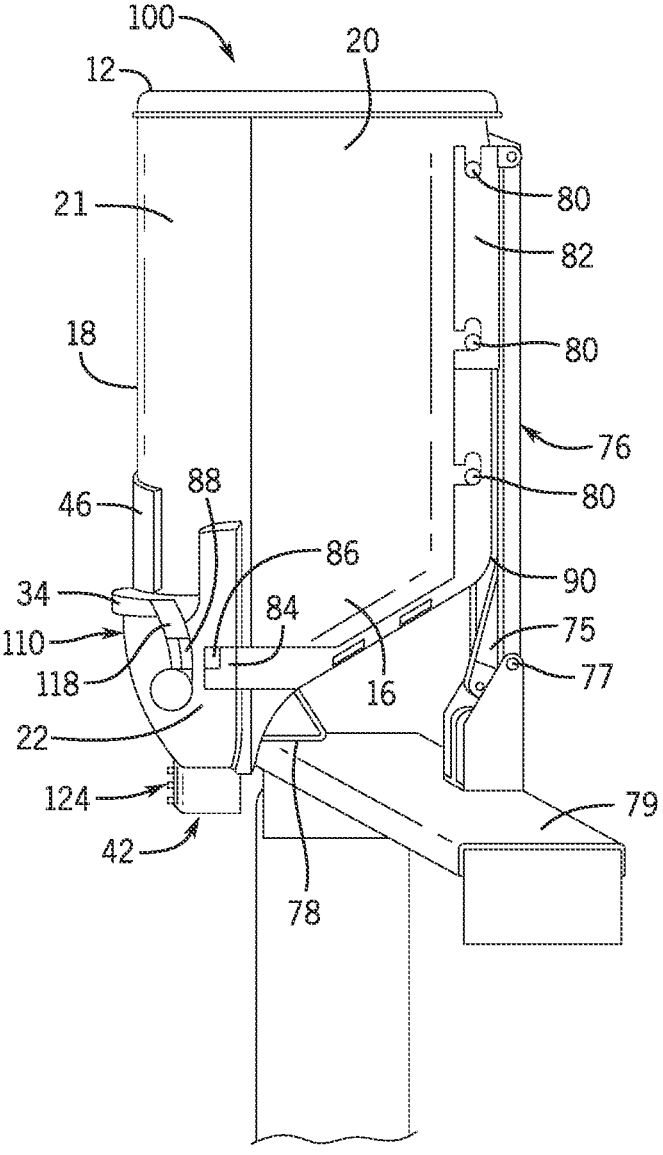
FIG. 1 depicts a gravity feed bulk dispenser with an actuation sensor.

FIG. 1 presents one example of a currently available gravity feed bulk dispenser 10. FIG. 1 further includes a sensor 86 as will be described in further detail herein which operates to detect the operation of the dispenser 10. In FIG. 1 right and left side walls 14, 16, and a lid 12 interconnect to form an enclosure that defines a first cavity 20. The right and left side walls 14, 16 and the front wall 18 interconnect to form an enclosure that defines a second cavity 21 and a third cavity 22. In operation, the first cavity 20 and the third cavity 22 are filled with a bulk product to dispense, while the second cavity 21 is filled with the same bulk product for display to the customer. In order to completely and effectively inform a customer about the bulk material within the dispenser 10, a printed display or sign can be held by a display holding device 46 located on an outside surface of the front wall 18.

A customer initiates the flow of the bulk product by moving the actuator assembly 110, which in FIG. 1 is a handle 34, in the direction of arrow 40. The customer holds a receptacle (not shown) below an outlet 42. The customer holds the handle 34 with one hand while holding the receptacle with the other. Actuation of the handle 34 opens a valve 122 (See FIGS. 2-5) internal to the bulk dispenser 10 connecting the first cavity 20 to the third cavity 22. Under the force of gravity, material flows from the first cavity 20, through the valve 122, then through the third cavity 22, out the outlet 42, and into the receptacle, in that order. After dispensing a desired amount of material into a receptacle, the customer releases handle 34 and biasing devices (not depicted) interact with the front wall 18 and the door to return the handle 34 back to the first position in which the gate separates the first cavity 20 from the third cavity 22, i.e. the normally closed position of the handle and door. As previously indicated, other examples of gravity feed bins are known and incorporated by reference in their entireties.

The dispenser valve 122 may exemplarily be a gate. However, it will be recognized that the valve 122 may be embodied in a variety of other components, any of which are within the scope of the present disclosure. The valve 122 may be any component of the dispenser that operates to control the start, stop, or other metering of the flow of the bulk product held within the dispenser. The valve 122 controls the ejection of the bulk product at a rate that is suitable for delivery to the customer. The valve 122 is configured to do so with minimal lag time between starting and stopping the bulk product dispense and do so with minimal leakage of the bulk material when the valve 122 is in the closed position. The valve 122 generally may operate according to one of two different valve configurations: a fixed displacement valve or a flow metering valve. In examples, valves of either of these two configurations may include the same or similar components, yet arranged to operate in one of these configurations.

In a fixed displacement valve system, a chamber of a defined volume is alternatively opened and closed such that a constant fixed volume of material is sequentially trapped/portioned and then released with each successive operations of the valve. Each fixed displacement valve system segregates a portion of the bulk material from the stored material as a whole and dispenses sequential increments of these segregated portions. These sequential increments of portions may be used to estimate and/or monitor the amount of the bulk material that has been dispensed. The valve system may be designed to repeatably produce a portion of a known volume. Fixed displacement systems may include any of a variety of mechanical systems.

A bi-gate system includes an input gate and an output gate defining a chamber there-between. First, the input gate is opened while the output gate remains closed until the chamber is filled to the desired measured level. This level may be defined by the volume of the chamber in which the chamber is configured to fill to a particular volume. Secondly, the input gate is closed while the output gate is opened, to evacuate the chamber and dispense the portioned product. In examples, the input gate and the output gates may be separate gating structures, or in other examples, the input gate and the output gates may be portions of a single gating structure.

A combined gate system incorporates the input gate and the output gate, as described above, into a single moving part. Such a system functions the same as the bi-gate system as described above, except the two gates are moved as a pair in a single motion under the same actuation. In some examples of such a system, both gates may both momentarily exist in a transitional state, wherein both gates are partially open, however, the geometry of the system is such that no significant leakage past both the input gate and the output gate during a single movement occurs.

A rotary gate system operates functions similarly to the bi-gate and combined gate systems as described above, however the gate system revolves to positions between open and closed positions of the input gate and the output gate. This is exemplarily contrasted with a reciprocal pivot as may be used to move the bi-gate or the combined gate as described above.

A screw system may use a rotary motion of a screw to draw bulk material axially along the length of the screw, pushed by the flight or flights of the screw. The spacing between the flight(s) define individually trapped volumes which are dispensed with reach rotation of the screw.

In a flow metering valve system, the valve is positioned between the container or compartment holding the bulk material and the outlet of the dispenser. The valve defines an orifice with a controllable area through which the bulk material can flow to the outlet. The open area of the valve controls the rate at which the bulk material flows to the outlet. The valve can be movable between open and closed positions or may be continuously adjusted between fully open and fully closed positions. Flow metering valve systems may exemplarily be used to compute volume and mass from a calibration-based and/or formula-based flow rate and duration calculation. The flow rate may be derived from a determination of the orifice area size (which may be determined based upon a detected or known position of the valve). A known or measured upstream pressure, weight, or volume of bulk material above the valve is used along with the orifice area size to determine the flow rate. A calibration technique and/or model equations and/or experimentally derived lookup tables for various bulk materials and/or conditions may be used to calculate the flow rate. Measurement of the volume or mass of the bulk material held within the dispenser may be further used in adjustment factors or formula variables in further calculations of the bulk material flow rate.

Flow metering valve systems may be implemented with any of a variety of structures, including with the examples provided herein. Gate valves may include a plate or door which is moved (e.g. raised or lowered) transverse to the outlet. A ball valve may be a cylindrical, elliptical, or spherical element with a cutout in the valve body, which as the valve body rotates within a valve housing, the orifice area through the valve is changed. A butterfly valve includes a plate of arbitrary shape that may be rotated via a shaft such that the plate is positioned into more axial alignment with the outlet (open) or more transverse across the outlet (closed). An iris valve includes a plurality of plates which are connected to move in a coordinated fashion to radially change the open cross-sectional area of the orifice.

Figure 2:
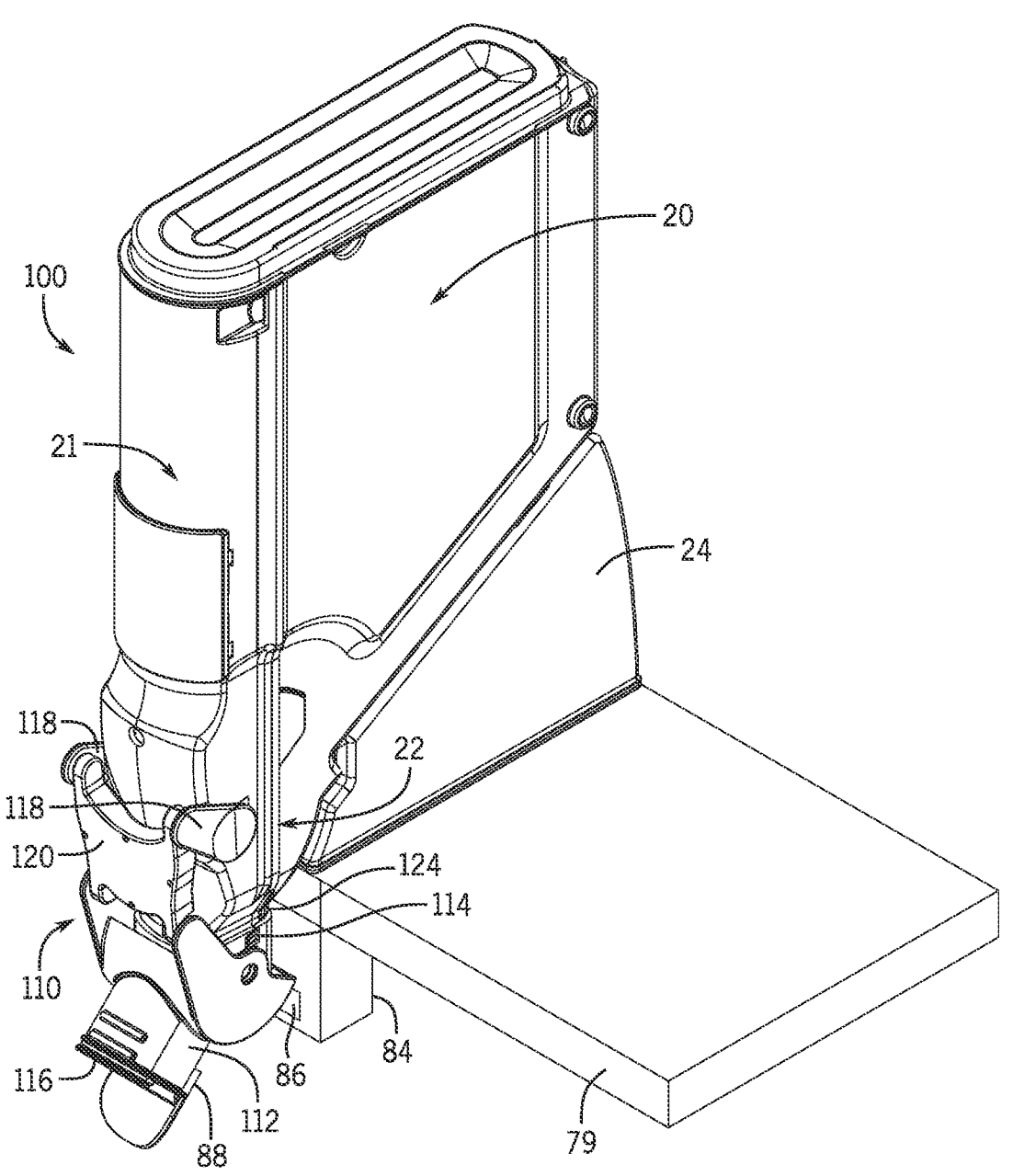
FIG. 2 is a perspective view of another example of a gravity feed bulk dispenser with an actuation sensor.

FIG. 2 presents another example of a gravity feed bulk dispenser 100. The dispenser 100 exemplarily includes similar first cavity 20, second cavity 21, and third cavity 22 as described above. Such first cavity 20, second cavity 21, and third cavity 22 may be similarly defined by side walls 14, 16, front wall 18, and a lid 12 as described above as well. While it is recognized that these features may remain the same between the dispensers of FIGS. 1 and 2, it is also apparent from the present disclosure that the dispenser 100 uses an actuator assembly 110 that differs from the handle 34. The actuator assembly 110 of FIG. 2 includes a spout actuator 112 which rotates relative to a pivot housing 114. The pivot housing is secured about a spout 124 of the dispenser 100. The spout actuator 112 is connected to a pair of handle arms 118 by a linkage 120. The actuator assembly 110 operates a valve 122 as described above to control the dispense of the bulk material. In the example shown in FIG. 2, the valve 122 is a gate that includes a rounded door 162 rotatable about arms 160. Movement of the actuator assembly 110 between operational positions moves the valve 122, between open and closed positions which occlude or permit bulk material to pass through the spout 124.

Internally, the actuator assembly 110 as depicted in either FIG. 1 or FIG. 2, opens a valve to release bulk material. The features of the actuator assembly 110 as described herein may be used with other examples of dispensers 100 while remaining within the scope of the present disclosure. The spout actuator 112 as shown in FIG. 2 facilitates indirect operation of the actuator assembly by enabling the receptacle to be used as the point of direct contact with the actuator assembly 110 and thus intermediate to the user and the actuator assembly 110.

Consumers may use disposable, single-use receptacles (e.g. cups or bags) or may use reusable storage containers to collect the product dispensed from the dispenser. Some consumers and retailers find preference for this type of product sale as it generally requires less packaging and therefore less consumer waste. Further, due to supply chain efficiencies, products can be sold in bulk at a more economical price than compared to pre-packaged portions. Lastly, some consumers may prefer the interactivity of the dispense of products from a bulk resource and the control over the volume of product acquired.

FIGS. 1 and 2 further depict different methods by which the gravity feed bulk dispensers 10, 100 can be installed or mounted in a retail store facility. FIG. 1 exemplarily depicts fixture for supporting the gravity feed bulk dispensers. The fixture may include an arm 76, which may include an upwardly biased scissors-type support arrangement. The arm 76 may be connected to a biasing device, such as a pneumatic cylinder 75. However, it will be recognized that springs or other tensioning devices may be used to bias the dispenser 10 towards the operational or upright position as depicted. The installation further includes a fixture, which may be a shelf 79, which is physically installed at the retail facility. The shelf 79 is configured to support one or both of the dispenser 10 and/or the arm 76 connected to which the dispenser 10 is connected. In an example wherein the shelf 79 is configured to support both the dispenser 10 and the arm 76, the dispenser 10 may further include a foot 78 configured to engage the shelf 79 when the dispenser 10 is in the operational position. The dispenser 10 is connected to the arm 76 by a bracket 82 by extensions 80 configured to releasably engage the bracket 82. To access the dispenser 10 for filling or cleaning, the dispenser 10 and the bracket 82 are rotated forward against the force of the biasing device about pivot 77. After filling and/or servicing, the dispenser 10 is rotated back to the operational position, with the help of the biasing device.

FIG. 2 exemplarily depicts a base 24 secured to the dispenser 100, and where the base 24 is configured to rest on the shelf 79 and support the dispenser 100 on the shelf 79. While not depicted, the shelf 79 and/or the base 24 may include engagement features for example tabs, notches, projections, slots, etc. which are configured to interact to releasably secure the base 24 to the shelf 79.

As described in further detail herein, the inventors have developed an arrangement wherein electronics configured for data collection and/or customer interaction/engagement are positioned within, or connected to (e.g. via arm 76), the shelf 79 or otherwise a separate component from the dispenser 10 itself. As the shelf 79 and associated components are a fixture within the retail facility, it has been found that integration of the data collection and other electronics components may be better suited into this fixture as opposed to the dispensers themselves. This adds data collection and customer engagement features while maintaining the efficient and economical solution of bulk gravity feed dispensers. One challenge of adding electronics to bulk gravity feed dispensers is that of supplying power to the sensors for detection, data processing, and data communication. In-fixture solutions present an advantage in this regard, as electrical power can be routed through wires in the fixture to the sensors and or associated electronics or displays. In still further examples, data communication can also be provided through in-fixture wires, to provide the gathered data to a controller or other computer processor for analysis rather providing the data analysis at each dispenser.

Figure 3:
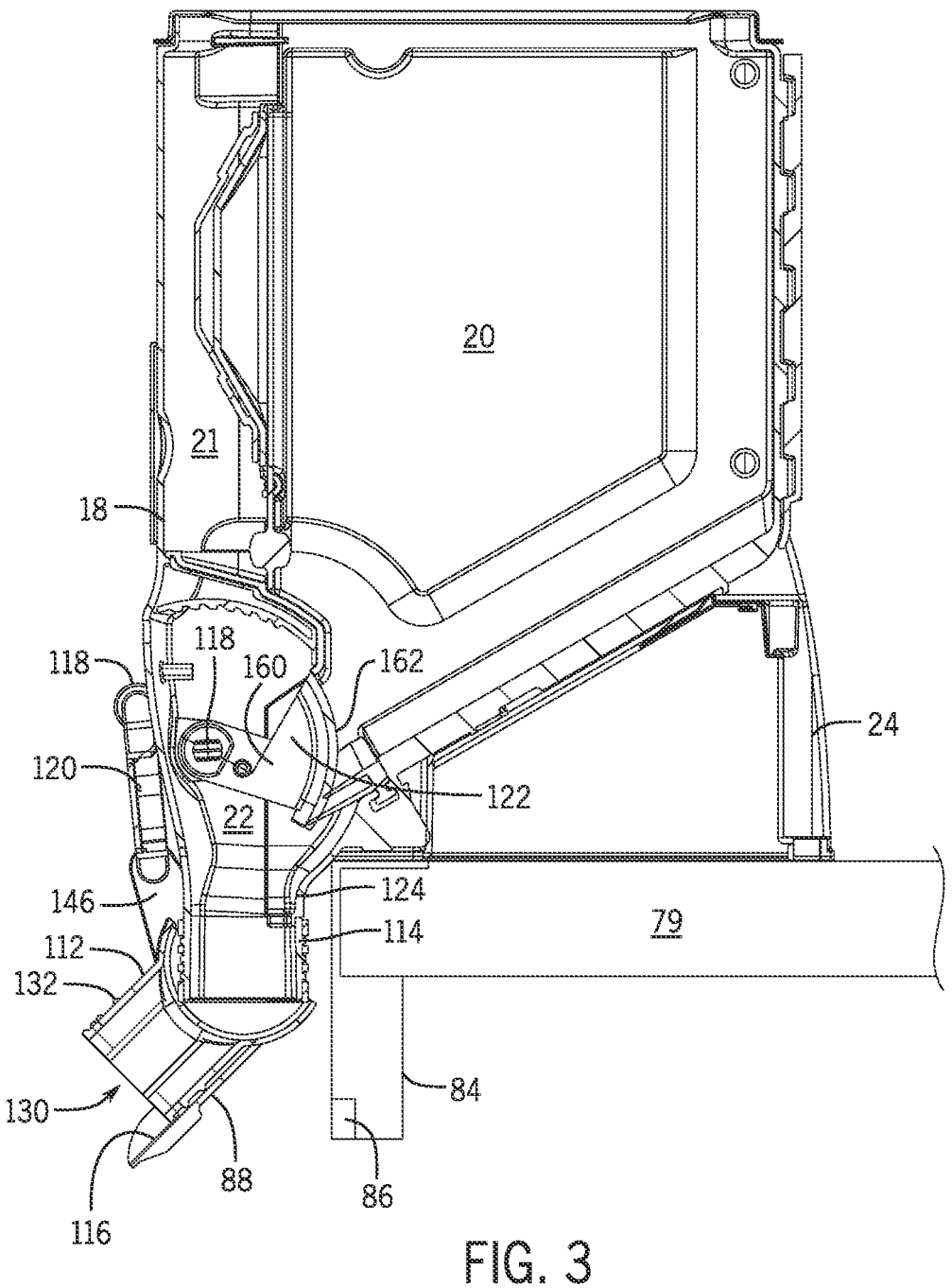
FIG. 3 is a side sectional view of the bulk dispenser of FIG. 2 in a closed condition.
Figure 4:
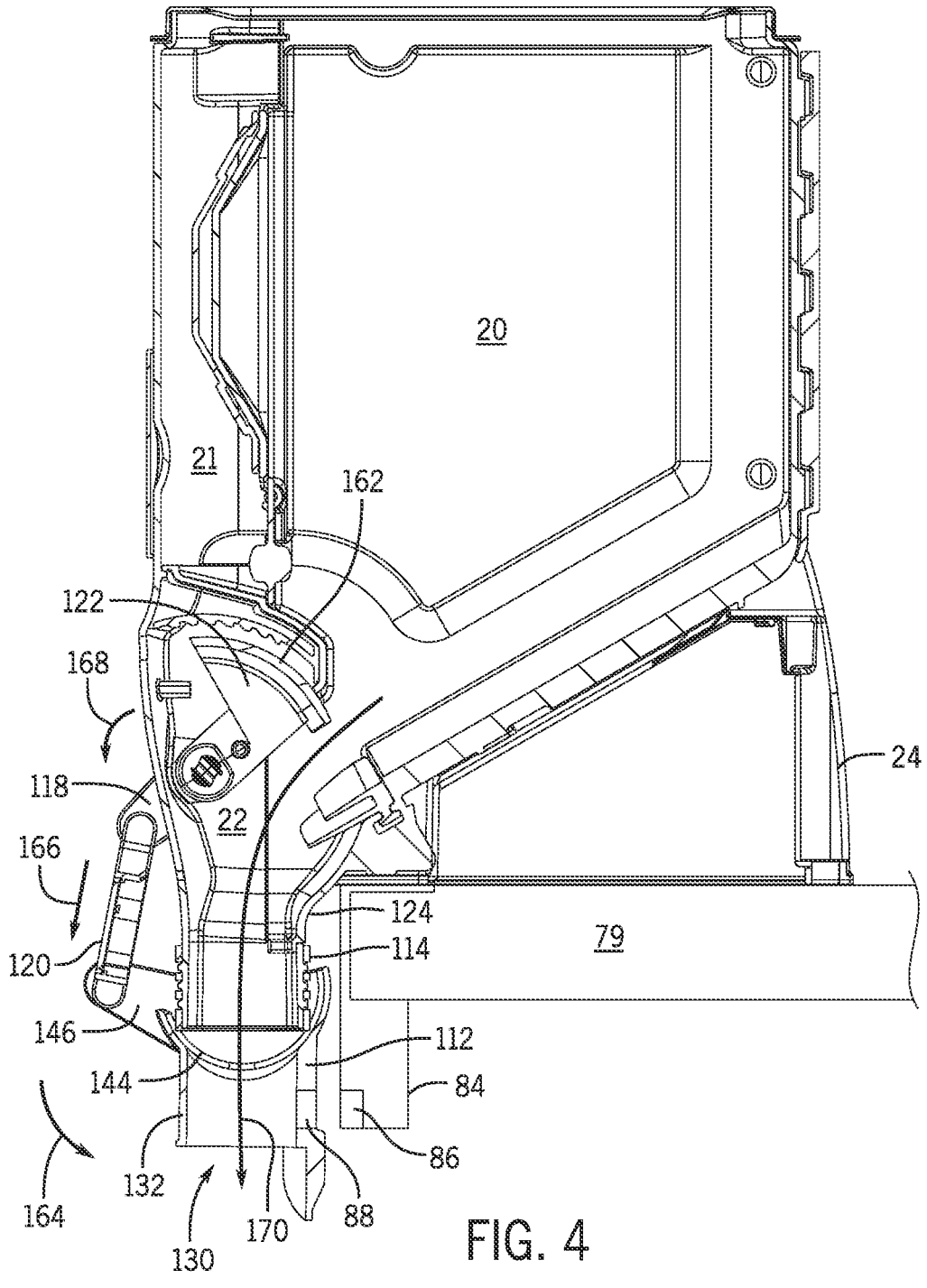
FIG. 4 is a side sectional view of the bulk dispenser of FIG. 2 in an open condition.
Figure 5:
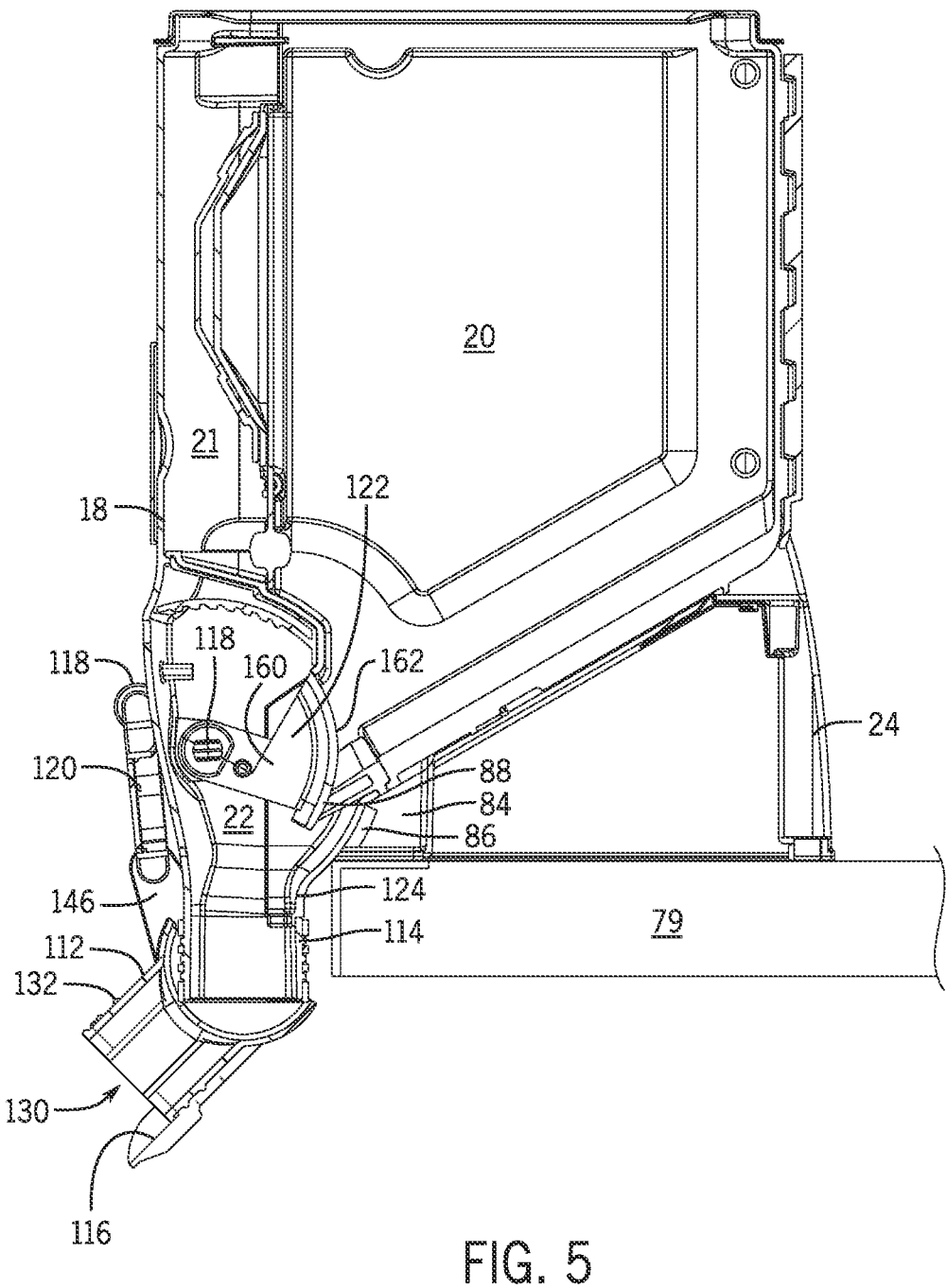
FIG. 5 is a side sectional view of another example of a gravity feed bulk dispenser with an actuation sensor.

An example of the data collection will be presented herein with respect to FIGS. 2-4. FIG. 3 is a side sectional view of the bulk dispenser of FIG. 2 in a closed condition. FIG. 4 is a side sectional view of the bulk dispenser of FIG. 2 in an open condition. However, it will be recognized that similar features as described with respect to FIGS. 2-4 also apply to the dispenser configuration as depicted in FIG. 1 or others as will be recognized in view of the present disclosure. The fixture 79 includes a sensor housing 84 which holds a sensor 86. The sensor 86 is exemplarily a proximity sensor. A proximity sensor may be a capacitive proximity sensor. Other examples of sensors include optical, Hall effect, magnetic field, reed switch, density, or contact sensors. Contact sensors may include limit switches, load cells, or resistive pressure sensors. The sensors as used herein are understood to incorporate a variety of known sensing systems beyond those explicitly disclosed herein. The sensor housing 84 may be integral to the fixture 79, or the sensor housing 84 may be configured to be a separate component that is connectable to the fixture 79. The sensor housing 84 exemplarily physically positions the sensor 86 relative to a detectable element 88 of the dispenser 100, as will be described in further detail herein. Such detectable element 88 being detectable by the modality of the sensor 86 noted above. The actuator assembly 110 may incorporate the detectable element 88. The detectable element 88 is exemplarily constructed of a magnetic material, or itself comprises a magnet. However, other examples of detectable elements 88, including ferrous and/or conductive materials will be recognized by a person of ordinary skill in the art from the disclosure of the present application. The detectable element 88 is exemplarily located in the spout actuator 112 as shown in FIGS. 2-4. In another example, the detectable element 88 is located in the handle arms 118, for example as shown in FIG. 1. In still further examples, as shown in FIG. 5, the detectable element 88 is positioned on or in the valve 122. Other locations of the detectable element within the actuator assembly 110 will also be recognized. As best shown in FIG. 3, when the bulk dispenser 100 is in the closed condition, the detectable element 88 is located at a position away from the sensor 86, however movement of the actuator assembly 110 to change the dispenser 100 from the closed condition to the open condition, moves the detectable element 88 proximate the sensor 86. In one example, the sensor 86 is a Hall effect sensor, that produces a signal reflective of changes in a magnetic field surrounding the sensor 86. Movement of the (e.g. magnetic) detectable element 88 proximate to the sensor 86 produces a change in the magnetic field about the sensor 86, which is reflected in the signal produced by the sensor 86. When the actuator assembly 110, and the detectable element 88, returns to the closed condition the signal from the sensor 86 returns to a default condition, indicating that the dispenser is in the closed condition.

In another example, the sensor 86 may be a visible or infrared (IR) spectrum light sensor that emits light energy and includes a detector that collects reflected returned light of that frequency. In such an example, the detectable element 88 may be a material and or surface configured to reflect, return, or interrupt emitted light energy when the actuator assembly 110 is in the open condition. In still further examples, the sensor 86 may be an electrical contact arranged for physical electrical contact with the detectable element 88 in, for example, a microswitch arrangement. Direct contact between the detectable element 88 and the sensor 86 to completes an electrical circuit, providing an indication of the dispenser is in the open or closed condition. Other examples of direct contact sensors include limit switches, load cells, or resistive pressure sensors.

FIG. 1 provides a further example of the bulk dispenser, wherein the arm 76 includes a bracket extension 90, extending from bracket 82, and which may be configured to further engage and support the dispenser 10, while also providing to position sensor housing 84 and sensor 86 relative to the actuator assembly 110, including the handle arm 118. In such an example, the handle arm 118 may include the detectable element 88, for example as described above. FIG. 1 exemplarily depicts an arrangement wherein the sensor 86 detects the actuator assembly in the closed condition, and for example, the system as described herein can monitor when the actuator assembly leaves and returns to the close condition. It will be recognized that the sensor 86 and the detectable element 88 may alternatively be arranged to sense when the actuator assembly 110 is in the open condition. In a still further example from FIG. 1, the bracket extension 90 may include the foot 78, configured to rest on the fixture, which may include a shelf 79.

FIG. 5 provides another example of the bulk dispenser. In the example of FIG. 5, it is recognized that all of the operational components may be the same as described above with respect to FIGS. 2-4, while the detectable element 88 is located in a portion of the valve 122. As a non-limiting example, the detectable element 88 is located in the door 162 of a valve 122 configured as a gate. It will be recognized that this example may be implemented with any of the valve configurations as described above. Operationally, the valve 122 and the actuator assembly 110 move in correlation, thus a detectable element 88 located in the valve 122 may similarly be detected by the sensor 86 positioned within a sensor housing 84 appropriately extending from the fixture 79 so as to sense the detectable element 88. The detectable element 88 will move with the valve 122 and operational states of the valve detected and determined therefrom. It will be recognized that other locations or configurations of sensor 86, for example that as shown in FIG. 1, may be suitably used with examples of the detectable element 88 located in the valve 122.

It will be recognized that features from the above description, while not being explicitly shown or described as being used together, may be combined to form further examples while remaining within the scope of the present disclosure.

Figure 6:
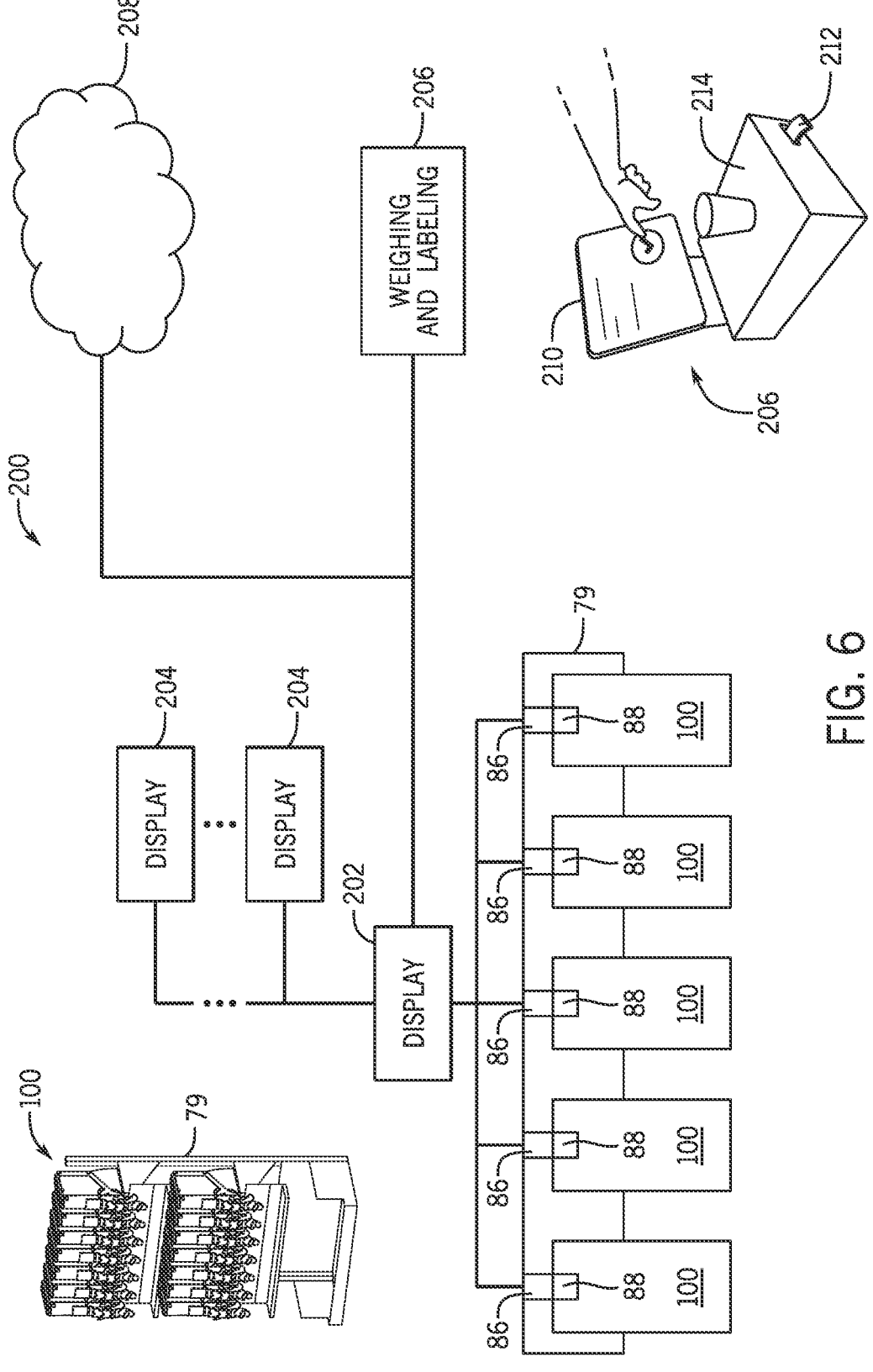
FIG. 6 is a system diagram of a system for bulk dispensing.

FIG. 6 is a system diagram that depicts further aspects of the implementation and use of the dispenser actuation detection as described above. It will be recognized that FIG. 6 is presented merely for descriptive purposes and that various embodiments of the disclosure may include a portion or some of the features as described herein, or additional features, while remaining within the scope of the present disclosure. FIG. 6 presents a system 200 of retail bulk material dispensing and sale. The system 200 includes a plurality of bulk dispensers 100 as described above. The fixture of the shelf 79 includes a sensor 86 as described above at a position relative to each of the dispensers such that the sensor 86 can detect the change in the open or closed condition of each of the dispensers 100. The sensors 86 are communicatively connected to a controller 202, which is exemplarily a single board computer (SBC) comprising a microprocessor and other electrical components and circuitry such as to configure the controller 202 to receive the signals from each of the sensors 86 and to process the signals to determine when each dispenser 100 enters an open condition and/or a closed condition. The sensors 86 may receive power through in-fixture wires, while in other examples, the sensors 86 may receive power from batteries or wirelessly. Similarly, the sensors 86 may be communicatively connected to the controller 202 with a wired or a wireless communicative connection. In still further examples, at least part of the sensor 86 may be secured to the fixture, while in other examples, at least part of the sensor 86 is secured to the dispenser itself.

As previously noted, in examples of the sensors, the sensors produce an output signal that changes when the detectable element 88 of the actuator assembly 110 moves, as a result of actuation of the dispenser between either of the open and closed position. The controller 202 receives these sensor signals and analyzes the sensor signals, for example by executing computer-readable code stored on a computer-readable medium and accessible by the controller, and upon execution of the computer-readable code, the controller processes the signals to determine when each sensor signal reflects a transition between dispenser condition states. Execution of the computer readable code further enables the controller to interpret the results of this analysis to relate the determined signal state to a dispense condition of the dispenser.

The system 200 is able to use this information in a variety of ways. First, the controller can operate to present an estimated dispense summary on one or more graphical displays 204 of the system. In a first example, one or more graphical displays are centrally located to a plurality of dispensers 100. In a second example, a graphical display is associated by proximity, and in an example, physical connection, to a single dispenser of the plurality. That is, each dispenser 100 is associated to its own graphical display 204. Power and communicative connections to the graphical displays 204 may be provided within the fixture. There are two general kinds of gravity feed dispensers: fixed volume and continuous flow. In a fixed volume dispenser, a portion of the bulk material is separated from the hopper and dispensed with each actuation of the actuator assembly 110. In a continuous flow dispenser actuation of the actuator assembly 110 to the open condition opens a flow path from the hopper to the outlet, bulk material flows out of the outlet so long as the actuator assembly 110 is held in the open condition. When the actuator assembly 110 is returned to the closed condition, the flow path is occluded and the flow of bulk material is stopped.

The controller 202 may receive information stored on a computer-readable medium that identifies the type of dispenser actuation (fixed volume or continuous flow), an identification of the bulk material, a portion volume/flow rate of the bulk material, and a unit price of the bulk material for each of the dispensers 100 in the system 200. The controller 202 may operate to produce an estimate of the amount of dispensed bulk material based upon analysis of the sensor signals, and the controller 202 may further operate the one or more graphical displays to visually present the estimated dispensed amount and an estimated cost of the dispensed amount.

The controller 202 may receive information regarding the dispenser and the bulk material associated with the dispenser in a variety of ways. During an installation set-up, the controller 202 may be provided with information regarding the type of dispenser actuation of the dispenser at each dispenser location on the fixture 79. Upon refill or replacement of a hopper of bulk material, the user may input, either through an entry into a user interface connected to the controller 202 or, for example, by scanning a bar code on the hopper or a package of bulk material from which the hopper is refilled. The bar code may include an SKU or PLC or other identification of the bulk material. Such identification may be used to reference a product lookup table with the bulk material information, including but not limited to hopper volume, bulk material identification, bulk material density, estimated total number of dispense cycles before depletion of the hopper, or bulk material unit price.

In another example, the replaceable hopper is self-identifying, for example by an RFID tag (or NFC communication device) that is readable by an associated (e.g. RFID) reader. The reader, for example, may be located in the fixture and positioned to read the RFID tag when the hopper is connected to the dispenser. Reading of the RFID tag by the reader identifies that the hopper has been replaced and such RFID tag may encode additional information as noted above regarding the bulk material contents of the hopper and/or the hopper itself. In another example, the hopper includes an identifying physical feature, for example an array or series of electrical pins or contacts which encode an identification of the hopper. This identifying physical feature is read by connection of the hopper to the fixture 79 and communicated to the controller 202. The controller can use the identification of the hopper to reference a managed database which includes the information as noted above regarding the bulk material contents of the hopper and/or the hopper itself.

The information regarding the contents of the hopper is communicated to the controller, either upon replacement of the hopper, after which such information is stored at the controller, or the information regarding the contents of the hopper is communicated to the controller through the fixture 79 along with the detection of a dispense operation as described above. If the dispenser 100 is known to be a fixed volume dispenser, then the controller 202 counts detected actuations of the dispenser and multiplies the count by the portion volume to produce an estimated dispense amount. The estimated dispense amount is multiplied by the unit price to arrive at an estimated cost. In bulk products, in which the unit is a weight, the estimated dispense volume may be multiplied by the bulk material density to estimate a dispense amount weight. The estimated dispense amount weight may be multiplied by a weight-based unit price to arrive at an estimated cost. In an example, this information may be presented on a graphical display 204 individually associated to the dispenser and may increment and update each time the customer moves the actuation assembly 110 to dispense another portion into the reusable receptacle.

If the dispenser 100 is known to the controller 202 to be a continuous flow dispenser, then the controller 202 instead operates to determine a length of time that the actuator assembly 110 is in the open condition based upon the signal from the sensor 86. The controller 202 multiplies the determined length of time by a predetermined flow rate of the bulk material for that dispenser to arrive at an estimated dispense volume. The estimated dispense volume is multiplied by the unit price for the bulk material to arrive at the estimated price. Both the estimated volume and the estimated price are visually presented on the graphical display 204 associated to the dispenser 100. In a further example, the visual presentation of the graphical display 204 may be updated intra-dispense as the controller 202 continuously measures the ongoing length of time of the dispense. As noted above, in bulk products in which the unit is a weight, the estimated dispense volume may be multiplied by the bulk material density to estimate a dispense amount weight. The estimated dispense amount weight may be multiplied by a weight-based unit price to arrive at an estimated cost. Such estimated dispense amount weight and estimated cost may be reported to the customer on the graphical display.

In either case, dependent upon the exact retail setting, the estimated amount and estimated price may not be sufficient to comply with retail pricing rules or regulations. The controller 202 may further be communicatively connected to a retail endpoint 206. Within examples provided herein the retail endpoint may include retail shopping related transaction or data systems which may include, but are not limited to a display, a scale, a cash register, a mobile app, a website, a retail network, or an internet account. In further examples, the retail endpoint may include a weighing station, a labeling station, or both. In the example of only a labeling station, each time the controller 202 identifies a dispense from a dispenser, the controller 202 provides an indication of the dispense to a labeling station. The labeling station may include a graphical display 210 that visually presents a list of the dispensers and associated bulk materials that have been dispensed within the system 100. The customer can select their bulk material from the list and a label printer 212 operates to print an identification label which may include an SKU, PLN, bar code, or QR code identifying the bulk material. This coordination between the dispensers and the label printer through the controller 202 can help customers properly identify the bulk materials dispensed and thwart customer substitution of a label for a lower cost, but similar looking, bulk material.

Relatedly, when the retail endpoint 206 further includes weighing functionality, for example with a scale, the customer is similarly presented with a list of the recent bulk material dispenses (e.g. those which have not yet been weighed or labeled) as supplied by the controller 202 to the graphical display 210, from which the customer selects their bulk material. The list on the graphical display 210 may further include the estimated amount to better help the customer identify their bulk material line item. Once the bulk material is selected, the dispensed bulk material can be weighed using the scale 214, and a label printed by the label printer 212 that identifies the bulk material and the marketable weight and price.

The controller 202 is further communicatively connected to a retail data network 208. The retail data network 208 may exemplarily be for a single store, for a region of stores, or a national data network. The retail data network 208 may be a networked computer or server that collects the data sent to the network 208 by the controllers 202 located within the network. The retail data network 208 may further include information technology tools or applications to facilitate management, organization, and/or sorting of the data to process the received data in order to provide retail insight into the operation and use of the bulk dispensers connected to the retail data network 208. The retail data network 208 receives and gathers the dispense data determined by the controller 202 (e.g. bulk material identification and amount) along with other retail-informative information including but not limited to: time and/or date of dispense, any ongoing sales promotions, or location of a dispenser within a fixture. This information provided to the retail data network enables computer or computers of the retail data network to process the information to identify trends or changes in trends surrounding customer purchases of bulk materials, which can better inform the customer experience, dispenser layout, or bulk material supply chain decisions.

In a still further example, the controller 202 and/or the retail data network 208 can use the detected actuations of the respective dispensers to provide an estimation of remaining volume in the hopper of each dispenser. This estimation can be based upon the same dispense volume estimations as described above with respect to fixed volume or continuous flow dispensers. In examples, the controller 202 and/or the retail data network 208 starts with the estimated initial volume of the bulk material in the dispenser. With each detected dispense, the controller and/or the retail data network 208 decrements the estimated dispense volume from the estimated initial volume. As the estimated remaining bulk material in the dispenser depletes, a stocking notice may be provided to a store inventory manager or personnel responsible for refilling the dispenser. In examples, a signal may be provided back to an associated graphical display 210 to provide a visual indication on the graphical display that the dispenser is running low of bulk material.

An estimated initial volume can be provided to the controller and/or the retail data network in a number of ways, examples of which are disclosed herein. In one example, the hopper of the dispenser is a removable and replaceable hopper with a defined volume of bulk material. When a depleted hopper is replaced with a filled hopper an input is made to the system, for example through a button or touch input associated with the graphical display to indicate that a new filled hopper has been loaded onto the dispenser. The controller 202 and/or the retail data network 208 exemplarily has access to stored data identifying the volume of the replaced filled hopper and begins decrementing volumes of dispenses from this stored value. Similarly, the new hopper may include a barcode which is scanned when the hopper is replaced on the dispenser, the scanning input indicative of a hopper replacement and information encoded in the barcode can identify details of the bulk material in the hopper, for example an identification of the material and/or an initial volume of material in the hopper. In another example, the replaceable hopper is self-identifying, for example by an RFID tag that is readable by an RFID reader. The RFID reader, for example, may be located in the fixture and positioned to read the RFID tag when the hopper is connected to the dispenser. Reading of the RFID tag by the RFID reader identifies that the hopper has been replaced and such RFID tag may encode additional information regarding the contents of the hopper and/or the estimated initial volume of the hopper.

In another example, the hopper may be fillable-in-place, but also include graduations, for example on an interior surface of the hopper. While the hopper may be refilled with bulk material, a worker may take note of the graduation associated with the filled hopper and enter this volume graduated estimate to the controller 202 and/or the retail data network 208.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gravity-feed bulk food dispensing system comprising:
   a hopper configured to hold a bulk food for dispense, the hopper comprising an identification element;
   a gravity-feed dispenser removably connected to the hopper, the gravity feed dispenser comprising:
   a spout;
   a valve separating the hopper from the spout;
   an actuator assembly connected the valve, the actuator assembly operable to move the valve between open and closed conditions to selectively permit bulk food to pass from the hopper out of the spout;
   a detectable element configured to move in coordination with the valve;

a fixture configured to engage and support the gravity feed dispenser, the fixture comprising a reader configured to read identification information from the identification element on the hopper when the gravity feed dispenser is supported by the fixture; and
   a sensor connected to the fixture and positioned relative to gravity-feed dispenser, the sensor operable to detect the detectable element and produce a signal indicative of the open condition or the closed condition of the valve; and
   a controller configured to receive the signal indicative of the open condition or the closed condition of the valve from the sensor and configured to receive the identification information from the reader.

2. The gravity-feed bulk food dispensing system of claim 1, wherein the valve comprises the detectable element.

3. The gravity-feed bulk food dispensing system of claim 1, wherein the actuator assembly comprises a pivotable spout extension.

4. The gravity-feed bulk food dispensing system of claim 1 wherein the detectable element is at least one of ferrous, conductive, or magnetic.

5. The gravity-feed bulk food dispensing system of claim 1, wherein the controller is configured to calculate an estimated dispense amount from the identification information and the signal indicative of the open condition or the closed condition of the valve.

6. The gravity-feed bulk food dispensing system of claim 5, further comprising a graphical display communicatively connected to the controller, wherein the controller is configured to operate the graphical display to present a visual indication of the estimated dispense amount.

7. The gravity-feed bulk food dispensing system of claim 6, wherein the controller is configured to calculate an estimated dispense cost and the controller is configured to operate the graphical display to present a visual indication of the estimated dispense cost.

8. The gravity-feed bulk food dispensing system of claim 6, wherein the graphical display is connected to the gravity-feed dispenser.

9. The gravity-feed bulk food dispensing system of claim 5, wherein the controller is configured to provide the identification information and the estimated dispense amount to a retail endpoint comprising a scale and a labeling system.

10. The gravity-feed bulk food dispensing system of claim 5, wherein the valve is a fixed displacement valve.

11. The gravity-feed bulk food dispensing system of claim 10, wherein the identification information comprises a product identification, a fixed displacement valve dispense amount, and a unit price, and the controller counts a number of actuations of the fixed displacement valve and calculates an estimated dispense cost from the number of actuations, dispense amount, and the unit price.

12. The gravity-feed bulk food dispensing system of claim 5, wherein the valve is a rotary valve.

13. A system for gravity-feed dispensing of bulk food, the system comprising:
   a plurality of hoppers, each configured to hold a bulk food for dispense;
   a first gravity-feed dispenser comprising a first hopper with a first identification element, a first spout, a first valve separating the first hopper from the first spout, a first actuator assembly connected to the first valve and operable to move the first valve between open and closed conditions to selectively permit bulk food to pass from the first hopper out of the first spout, and a first detectable element configured to move in coordination with the valve;

a second gravity-feed dispenser comprising a second hopper with a second identification element, a second spout, a second valve separating the second hopper from the second spout, a second actuator assembly connected to the second valve and operable to move the second valve between open and closed conditions to selectively permit bulk food to pass from the second hopper out of the second spout, and a second detectable element configured to move in coordination with the valve;

a fixture configured to engage and support the first gravity-feed dispenser and the second gravity-feed dispenser, the fixture comprising a first reader associated with the first gravity-feed dispenser and configured to read identification information from the first identification element on the first hopper and a second reader associated with the second gravity-feed dispenser and configured to read identification information from the second identification element on the second hopper;

a first sensor connected to the fixture and positioned relative to the first gravity-feed dispenser, the first sensor configured to detect the first detectable element and configured to produce a first signal indicative of the open condition or the closed condition of the first valve;

a second sensor connected to the fixture and positioned relative to the second gravity-feed dispenser, the second sensor configured to detect the second detectable element and configured to produce a second signal indicative of the open condition or the closed condition of the second valve; and a controller communicatively connected to the first and second readers, the first sensor and the second sensor, wherein the controller is configured to receive the first signal and the second signal and configured to determine a dispense operation of the first gravity-feed dispenser or the second gravity-feed dispenser from the first signal and or the second signal, and wherein the controller is configured to receive the identification information from the readers.

14. The system for gravity-feed dispensing of claim 13, further comprising a plurality of hoppers each configured to be refilled and interchangeably connected to the first gravity-feed dispenser and the second gravity-feed dispenser, the plurality of hoppers comprising the first hopper and the second hopper.

15. The system for gravity-feed dispensing of any of claim 13, wherein the fixture comprises a shelf.

16. The system for gravity-feed dispensing of claim 13, wherein the controller is configured to calculate a first estimated dispense amount and a first estimated dispense cost of a first dispense operation of the first gravity feed dispenser and is configured to calculate a second estimated dispense amount and a second estimated dispense cost of a second dispense operation of the second gravity feed dispenser.

17. The system for gravity-feed dispensing of claim 16, further comprising a first graphical display communicatively connected to the controller, wherein the controller is configured to operate the graphical display to present a visual indication of at least one of the first estimated dispense amount and the first estimated dispense cost or the second estimated dispense amount and the second estimated dispense cost.

18. The system for gravity-feed dispensing of claim 17, further comprising a second graphical display, and wherein:

the first graphical display is physically associated to the first gravity-feed dispenser and configured to be operated by the controller to present a visual indication of the first estimated dispense amount and the first estimated dispense cost; and the second graphical display is physically associated to the second gravity-feed dispenser and is configured to be operated by the controller to present a visual indication of the second estimated dispense amount and the second estimated dispense cost.

19. The system for gravity-feed dispensing of claim 13, further comprising:

a weighing and labeling station, physically separated from the first gravity-feed dispense and the second gravity-feed dispenser, the weighing and labeling station comprising a scale and a label printer, the label printer configured to print an identification label encoding weight information from the scale, wherein the weighing and labeling station is communicatively connected to the controller and configured to receive an identification of the first dispense operation and an identification of the second dispense operation.

20. The system for gravity-feed dispensing of claim 19, wherein the weighing and labeling station further comprises a graphical display and the graphical display is configured to visually present an identification of the first dispense operation and an identification of the second dispense operation for selection by a user.

* * * * *